US008683258B2

(12) United States Patent
Kaliannan et al.

(10) Patent No.: US 8,683,258 B2
(45) Date of Patent: Mar. 25, 2014

(54) FAST I/O FAILURE DETECTION AND CLUSTER WIDE FAILOVER

(75) Inventors: Kirubakaran Kaliannan, Beaverton, OR (US); Venkata Sreenivasa Rao Nagineni, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 273 days.

(21) Appl. No.: 13/250,823

(22) Filed: Sep. 30, 2011

(65) Prior Publication Data

US 2013/0086413 A1    Apr. 4, 2013

(51) Int. Cl.
    *G06F 11/00*    (2006.01)
(52) U.S. Cl.
    USPC .......................................... 714/4.11; 714/43
(58) Field of Classification Search
    USPC ............... 714/4.1, 4.11, 6.2, 6.21, 6.22, 6.23, 714/6.24, 6.3, 42, 43
    See application file for complete search history.

(56) References Cited

U.S. PATENT DOCUMENTS

| 6,578,158 | B1 * | 6/2003 | Deitz et al. ..................... 714/11 |
| 7,797,565 | B1 * | 9/2010 | Tran et al. ..................... 714/4.1 |
| 2005/0283658 | A1 * | 12/2005 | Clark et al. ..................... 714/11 |
| 2012/0254654 | A1 * | 10/2012 | Blinick et al. ............... 714/4.11 |
| 2012/0260127 | A1 * | 10/2012 | Jibbe et al. ................... 714/6.21 |
| 2012/0265910 | A1 * | 10/2012 | Galles et al. .................. 710/300 |

\* cited by examiner

*Primary Examiner* — Scott Baderman
*Assistant Examiner* — Joseph Kudirka
(74) *Attorney, Agent, or Firm* — Wilmer Cutler Pickering Hale and Dorr LLP

(57) ABSTRACT

A method for fast I/O path failure detection and cluster wide failover. The method includes accessing a distributed computer system having a cluster including a plurality of nodes, and experiencing an I/O path failure for a storage device. An I/O failure message is generated in response to the I/O path failure. A cluster wide I/O failure message broadcast to the plurality of nodes that designates a faulted controller. Upon receiving I/O failure responses from the plurality of nodes, an I/O queue message is broadcast to the nodes to cause the nodes to queue I/O through the faulted controller and switch to an alternate controller. Upon receiving I/O queue responses from the plurality of nodes, an I/O failover commit message is broadcast to the nodes to cause the nodes to commit to a failover and un-queue their I/O.

20 Claims, 10 Drawing Sheets

FAST I/O FAILURE DETECTION AND CLUSTER WIDE FAILOVER

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as electronic commerce websites. HA cluster implementations attempt to build redundancy into a cluster to eliminate single points of failure, including multiple network connections and data storage which is multiply connected via storage area networks or Internet protocol-based storage. Additionally, HA clusters are often augmented by connecting them to multiple redundant HA clusters to provide disaster recovery options.

In a multi node clustering, the disks/logical unit numbers (LUNs) are shared across the nodes to provide data availability and to provide multi-point access for improved performance. In a clustered configuration, a path failure to a LUN would trigger a cluster wide input/output (I/O) failover protocol to choose the best common paths on all of the nodes of the cluster. With a large cluster (e.g., with 32 nodes), and with large number of LUNs (e.g., with 4000 LUNs) on the system, a path failure would trigger the protocol where the nodes of the cluster each choose the best available path for the LUN. Thus, if one path to all 4000 LUNs fails, the notes comprising the cluster generate a large number of network messages that are exchanged between them for each path. The resulting traffic has a negative impact on failover performance because the large numbers of messages impose very high central processing unit (CPU) usage during this protocol activity.

SUMMARY OF THE INVENTION

Embodiments of the present invention provide a proactive approach of failing over I/O paths. Embodiments of the present invention efficiently implement a cluster wide I/O path failover that greatly reduces protocol overhead and application availability.

In one embodiment, the present invention is implemented as a method for fast I/O path failure detection and cluster wide failover. The method includes accessing a distributed computer system having a cluster including a plurality of nodes, and experiencing an I/O path failure for a storage device. An I/O failure message is generated in response to the I/O path failure. A cluster wide I/O failure message broadcast to the plurality of nodes that designates a faulted controller. Upon receiving I/O failure responses from the plurality of nodes, an I/O queue message is broadcast to the nodes to cause the nodes to queue I/O through the faulted controller and switch to an alternate controller. Upon receiving I/O queue responses from the plurality of nodes, an I/O failover commit message is broadcast to the nodes to cause the nodes to commit to a failover and un-queue their I/O.

In one embodiment, the I/O failure message is a cluster wide broadcast message.

In one embodiment, the I/O queue message is a cluster wide broadcast message.

In one embodiment, the I/O failover commit message is a cluster wide broadcast message.

In one embodiment, the cluster wide I/O failure message includes an I/O path failure ID that identifies an I/O path that caused the I/O path failure.

In one embodiment, the cluster wide I/O failure message includes a controller identifier (ID) that identifies a controller through which the I/O path failure transited.

In one embodiment, the storage device comprises a LUN of a disk array.

In one embodiment, the present invention is implemented as a computer readable storage medium having stored thereon, computer executable instructions that, if executed by a computer system cause the computer system to perform a method for fast I/O path failure detection and cluster wide failover, comprising, accessing a distributed computer system having a cluster including a plurality of nodes; experiencing an I/O path failure for a storage device; generating an I/O failure message in response to the I/O path failure; broadcasting a cluster wide I/O failure message to the plurality of nodes that designates a faulted controller; upon receiving I/O failure responses from the plurality of nodes, broadcasting an I/O queue message to the nodes to cause the nodes to queue I/O through the faulted controller and switch to an alternate controller; and upon receiving I/O queue responses from the plurality of nodes, broadcasting an I/O failover commit message to the nodes to cause the nodes to commit to a failover and un-queue their I/O.

In one embodiment present invention is implemented as a server computer system. The server computer system includes a computer system having a processor coupled to a computer readable storage media and executing computer readable code which causes the computer system to implement a failure detection agent that functions by: accessing a distributed computer system having a cluster including a plurality of nodes; experiencing an I/O path failure for a storage device; generating an I/O failure message in response to the I/O path failure; broadcasting a cluster wide I/O failure message to the plurality of nodes that designates a faulted controller; upon receiving I/O failure responses from the plurality of nodes, broadcasting an I/O queue message to the nodes to cause the nodes to queue I/O through the faulted controller and switch to an alternate controller; and upon receiving I/O queue responses from the plurality of nodes, broadcasting an I/O failover commit message to the nodes to cause the nodes to commit to a failover and un-queue their I/O.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
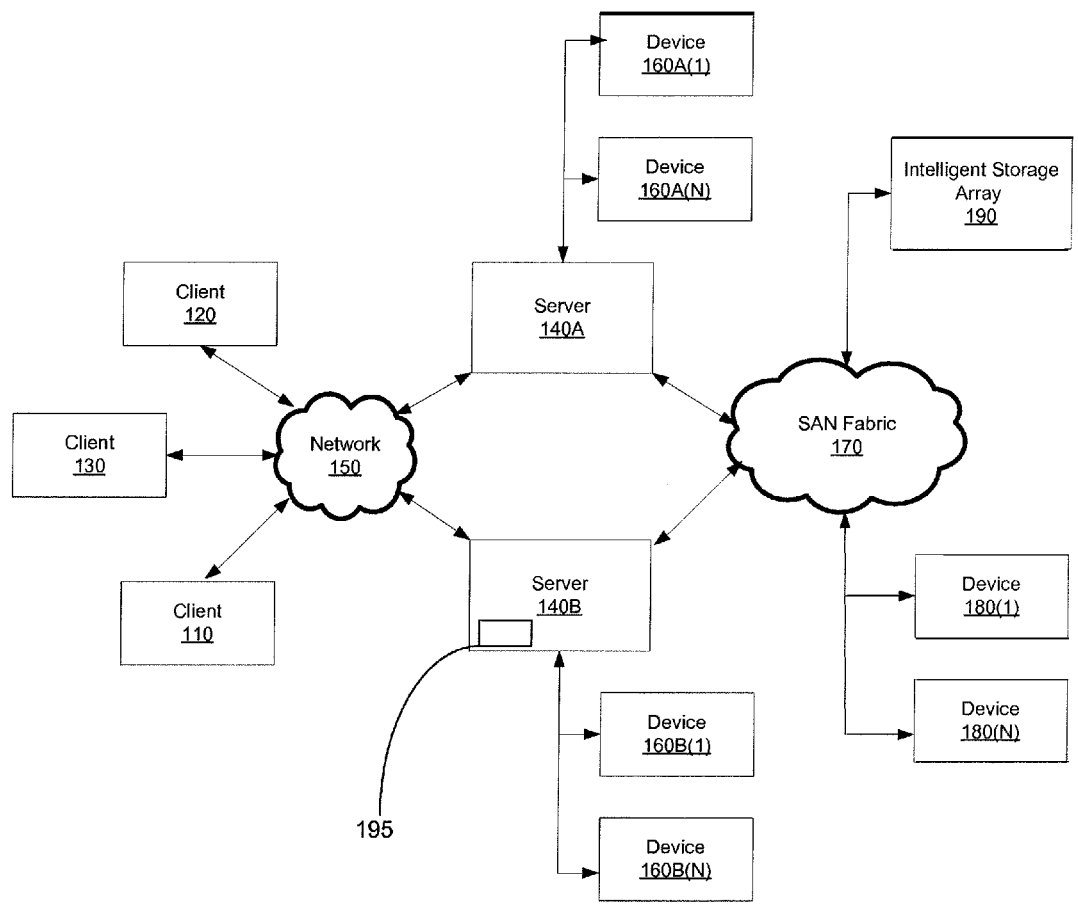
FIG. 1 shows a block diagram depicting a network architecture in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention provide a proactive approach of failing over I/O paths. Embodiments of the present invention efficiently implement a cluster wide I/O path failover that greatly reduces protocol overhead and application availability. Decreasing I/O path failure detection and recovery time by few seconds can prevent business organizations deploying the high availability and disaster recovery solutions, from incurring significant financial loss.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A(1)-(N) directly attached, and storage server 140B is depicted with storage devices 160B(1)-(N) directly attached. Storage servers 140A and 140B are also connected to a storage area network (SAN) fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via an I/O failure manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
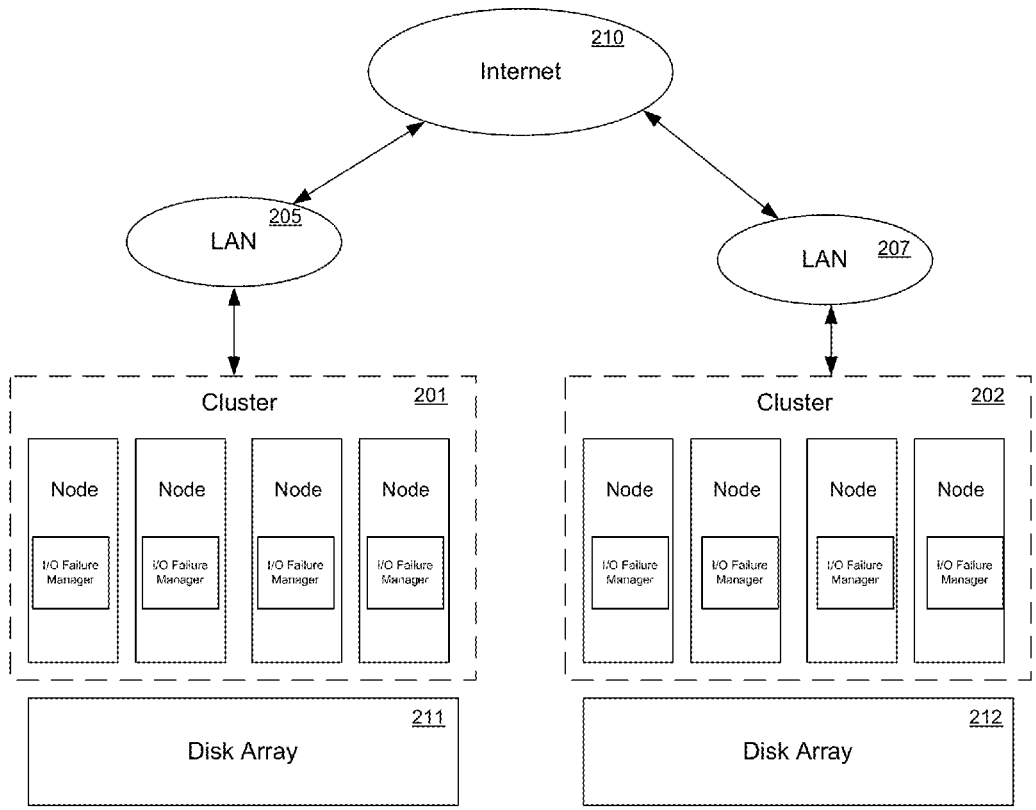
FIG. 2 shows a diagram depicting a high availability multi-cluster-based computing system in accordance with one embodiment of the present invention.

FIG. 2 shows a diagram depicting a high availability multi-cluster-based computing system in accordance with one embodiment of the present invention. As illustrated in FIG. 2, two clusters 201-202 are shown. The clusters 201-202 each comprise a four node cluster. Each of the constituent nodes is shown connected to a respective disk array 211-212. The nodes of each cluster communicate with one another via local area networks 205-207. These local area networks are in turn connected to the Internet 210. Although the embodiments described in the context of clusters of four nodes, it should be appreciated that embodiments of the present invention can readily scale and function in distributed computer systems and/or cloud based computer systems having hundreds or thousands of nodes.

Thus, FIG. 2 shows the basic layout of a typical high-availability multi-cluster computer system environment. As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

FIG. 2 also shows the inclusion of a plurality of I/O failure managers in each of the clusters 201-202. The failure managers implement the fast cluster I/O failure detection and cluster wide I/O path fail over functionality of embodiments of the present invention. In the FIG. 2 embodiment, the storage and the input and output to that storage is provided by the respective disk arrays 211-212.

Figure 3:
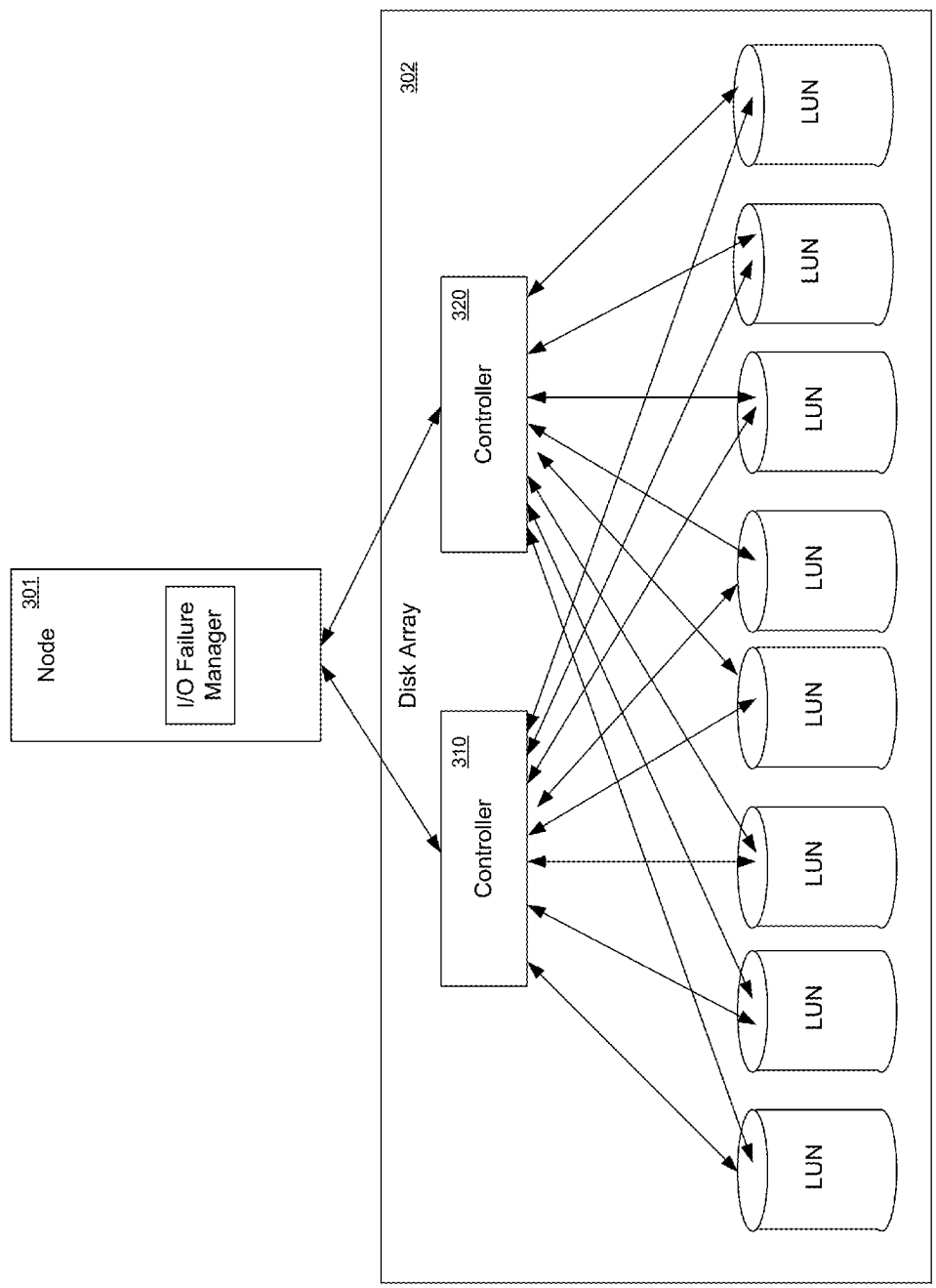
FIG. 3 shows an exemplary node 301 coupled to a disk array 302 in accordance with one embodiment of the present invention.

FIG. 3 shows an exemplary node 301 coupled to a disk array 302 in accordance with one embodiment of the present invention. As shown in FIG. 3, the disk array includes two controllers 310-320 which control input output to the multiple LUNs.

The two controllers 310-320 implemented both active and primary I/O and active and secondary or passive I/O. Thus, the node 301 can be coupled to each of the LUNs through either of the controllers 310-320. Generally, the same would hold true for all the other nodes in the cluster. Since each node can implement multiple paths to a given LUN, the nodes optimize a selected path to achieve higher I/O performance (e.g., lower latency, etc.). This optimized path becomes the active and primary I/O path and other non-optimized paths become passive non-optimized paths.

In a multi node clustering, the disks/LUNs are shared across the nodes to provide data availability and to provide multi-point access for improved performance. As described above, conventionally, in a clustered configuration, a path failure to a LUN would trigger a cluster wide I/O failover protocol to choose the best common paths on all of the nodes of the cluster. With a large cluster (e.g., with 32 nodes), and with large number of LUNs (e.g., with 4000 LUNs) on the system, a path failure would trigger the protocol where the nodes of the cluster each choose the best available path for the LUN. Thus, if one path to all 4000 LUNs fails, the notes comprising the cluster generate a large number of network messages that are exchanged between them for each path. The resulting traffic has a negative impact on failover performance because the large numbers of messages impose very high CPU-usage during this protocol activity.

Embodiments of the present invention advantageously avoid protocol overhead and the resulting CPU overhead. Embodiments of the present invention maintain high failover performance, even in large cluster configurations, because protocol overhead is greatly reduced.

Figure 4:
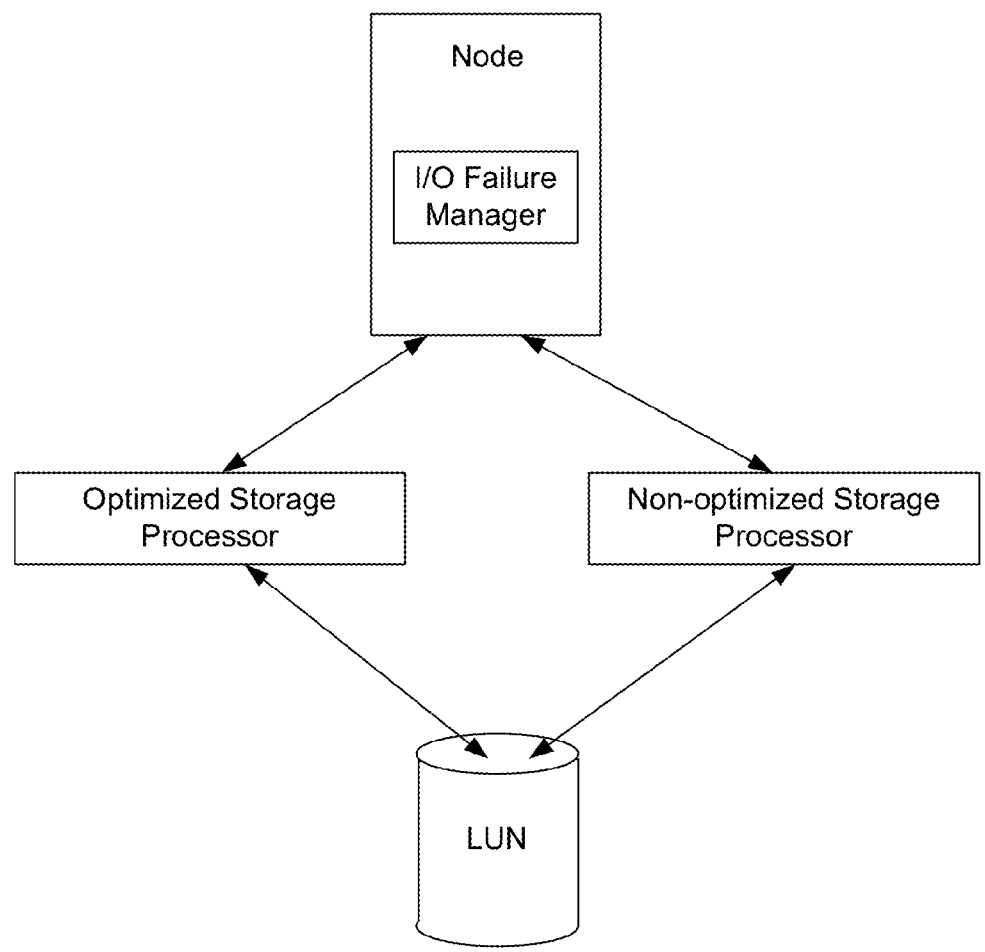
FIG. 4 shows an exemplary node with two I/O paths to a LUN in accordance with one embodiment of the present invention.

FIG. 4 shows an exemplary node with two I/O paths to a LUN in accordance with one embodiment of the present invention. As described above, the disk array includes two controllers which control input output to the multiple LUNs. Since each node can implement multiple paths to a given LUN, the nodes optimize a selected path to achieve higher I/O performance (e.g., lower latency, etc.). This optimized path becomes the active and primary I/O path and other non-optimized path becomes the passive non-optimized path. This is shown in FIG. 4 as the optimized storage processor and the non-optimized storage processor.

In one embodiment, on any single path failure to a disk or LUN, the I/O failure manager will find the corresponding controller and cause all the paths connected to that controller to fail in one single protocol request. Embodiments of the present invention advantageously utilize the fact that most path failures are mainly due to the controller failures. Because of this, implementing a proactive cluster wide controller-level-failover results in much faster failover performance.

For example, an I/O failure may trigger a path analysis on the system. If a given path experiences a failure, then there is a need to failover from the active-optimized path to the passive-non-optimized path, or vice versa. As described above, in most cases the failure of a path is due to a controller failure. Because of this, embodiments of the present invention implement a cluster-wide failover protocol to fail all paths that pass through the controller that experiences the problem (e.g., the first path failure). The I/O failure manager will issue messages to the other nodes of the cluster to proactively fail paths that transit the faulty controller and switch to paths of other controllers. Thus for example, if the optimized storage processor has a fault that causes a path failure, paths from the nodes that transit the optimized storage processor are failed, and switched to the non-optimized storage processor.

This proactive failover of embodiments of the present invention will cause the failover for all the remaining LUNs proactively (e.g., even those which have not experienced an I/O failure yet). The proactive failover for all nodes of a cluster will reduce the high-volume of messaging between the nodes. For example, the failover time for 4000 LUNs is done in the same time as it takes for a single disk.

It should be noted that in one embodiment, the node experiencing the I/O path failure can send a failure message to a controller node which takes care of the failover protocol. Alternatively, the node experiencing the I/O path failure can initiate the protocol without using the controller node. In one embodiment, the failure message can include failing path ID and a failing controller ID. When other nodes of the cluster receive the failure message including the failing controller ID, the other nodes can then proactively failover any I/O paths that transit the failing controller.

In one embodiment, once the controller node receives the information in the failure message, it can broadcast the above information to all the nodes in the cluster to inform them to use an alternate controller for I/O. The controller node then broadcasts to all the nodes to queue the I/O on the affected controller. Upon receiving responses from all nodes to the broadcast, the controller node can then broadcasts to the other nodes to commit the failover on all the nodes to the new controller, and to un-queue their I/O.

Figure 5:
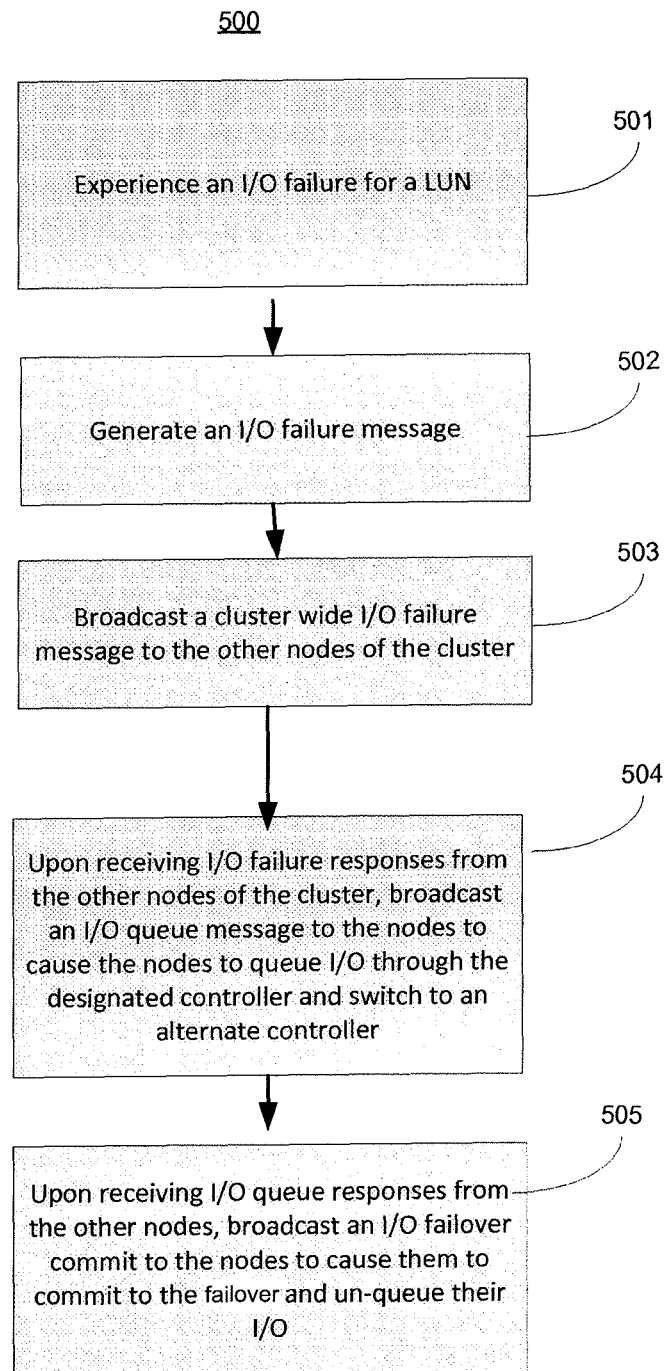
FIG. 5 shows a diagram illustrating an I/O failover process in accordance with one embodiment of the present invention.

FIG. 5 shows a diagram illustrating an I/O failover process 500 in accordance with one embodiment of the present invention. As depicted in FIG. 5, process 500 shows exemplary operating steps of a process of proactively failing over I/O paths from a faulty controller.

Process 500 begins in step 501, where a node experiences a LUN I/O failure. For example, in one embodiment, a failure manager can detect the I/O failure and begin the process of proactive failover.

In step 502, an I/O failure message is generated. As described above, this failure message can include an I/O path failure ID and an I/O path controller ID.

In step 503, the node broadcasts a cluster wide I/O failure message to the other nodes of the cluster. This cluster wide I/O failure message includes information regarding the I/O failure path ID and the I/O path controller ID.

In step 504, upon receiving I/O failure responses from the other nodes of the cluster, the no broadcasts and I/O queue message to the nodes to cause the nodes to queue their pending I/O's to the controller designated by the controller ID. This causes the other nodes of the cluster to stop issuing I/O through the designated controller and to keep any pending I/O in a queue. The other nodes of the cluster then switch to the alternate controller.

In step 505, upon receiving I/O queue responses from the other nodes, the no broadcasts and I/O failover commit to the nodes. This causes the nodes to commit to the failure and un-queue their I/O so that normal input-output proceeds through the alternate controller.

Figure 6:
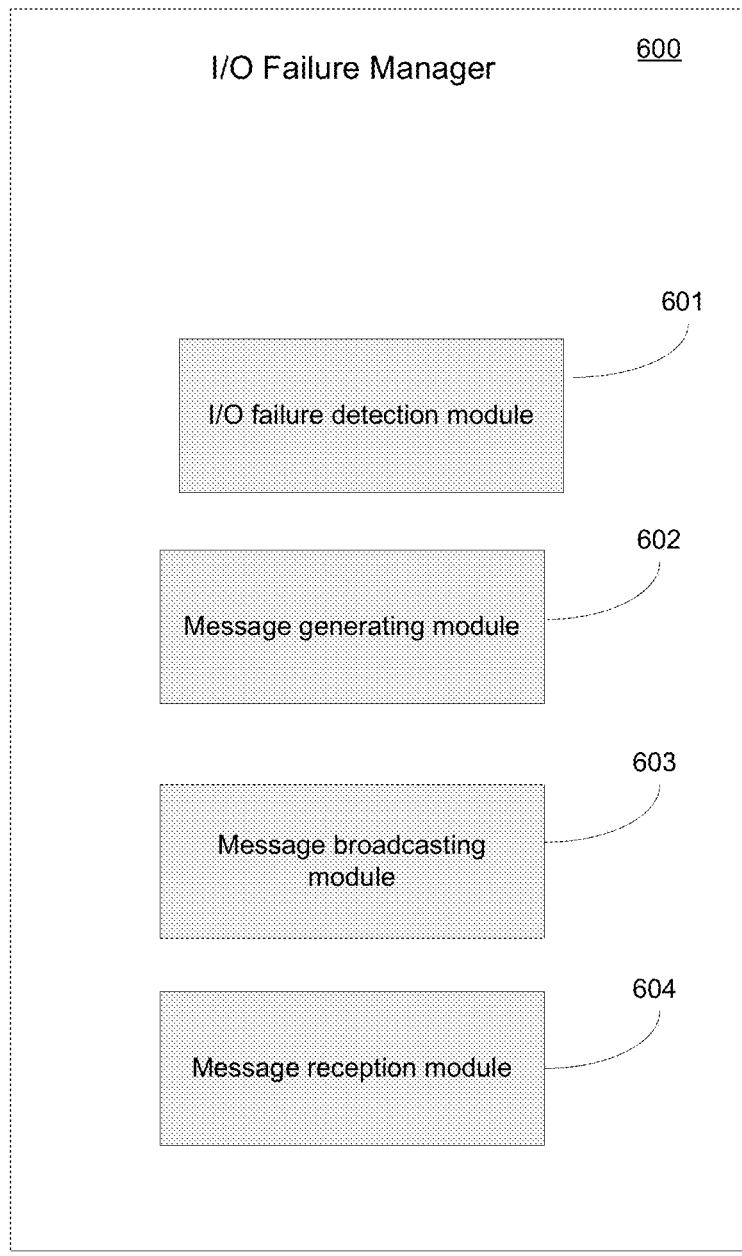
FIG. 6 shows software components an exemplary I/O failure manager in accordance with one embodiment of the present invention.

FIG. 6 shows software components an exemplary I/O failure manager 600 in accordance with one embodiment of the present invention. In FIG. 6 embodiment, the failure manager includes an I/O failure detection module 601 which functions by detecting occurrences of I/O failure and initiating the process of proactive failover. The failure manager further includes a message generating module 602 which functions by generating messages that identify I/O path IDs and I/O path controller IDs. The failure manager further includes a message broadcasting module 603 which functions by broadcasting messages, including cluster wide I/O failure messages and cluster wide I/O failover commit messages. The failure manager further includes a message reception module 604 which functions to receive responses from the other nodes of the cluster.

Figure 7:
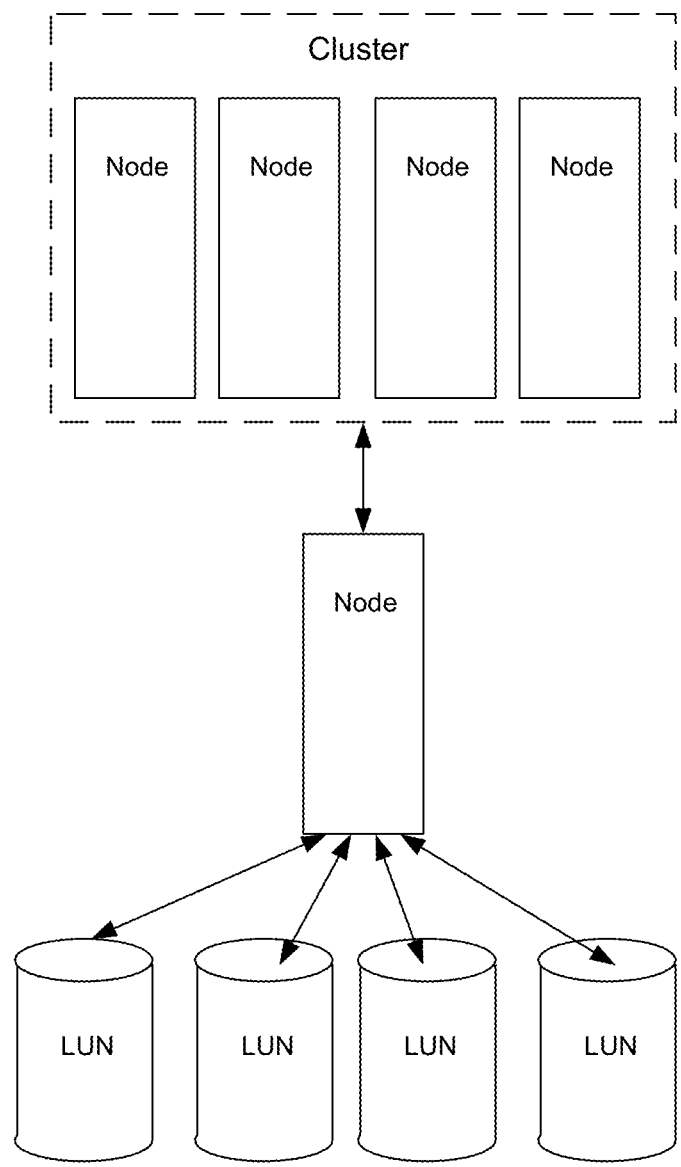
FIG. 7 shows a diagram depicting a high availability multi-cluster-based computing system in accordance with one embodiment of the present invention.

FIG. 7 shows a diagram depicting a high availability multi-cluster-based computing system in accordance with one embodiment of the present invention. The FIG. 7 embodiment is an alternative to the FIG. 2 embodiment in that the multiple LUNs are managed by a node as opposed to being in a disk array. As illustrated in FIG. 7, the four nodes of the cluster are connected to a storage node. The storage node manages the replication and data distribution across the LUNs (e.g., a redundant array of independent disks (RAID), configuration, etc.). Although the embodiments described in the context of clusters of four nodes, it should be appreciated that embodiments of the present invention can readily scale and function in distributed computer systems and/or cloud based computer systems having hundreds or thousands of nodes.

Figure 8:
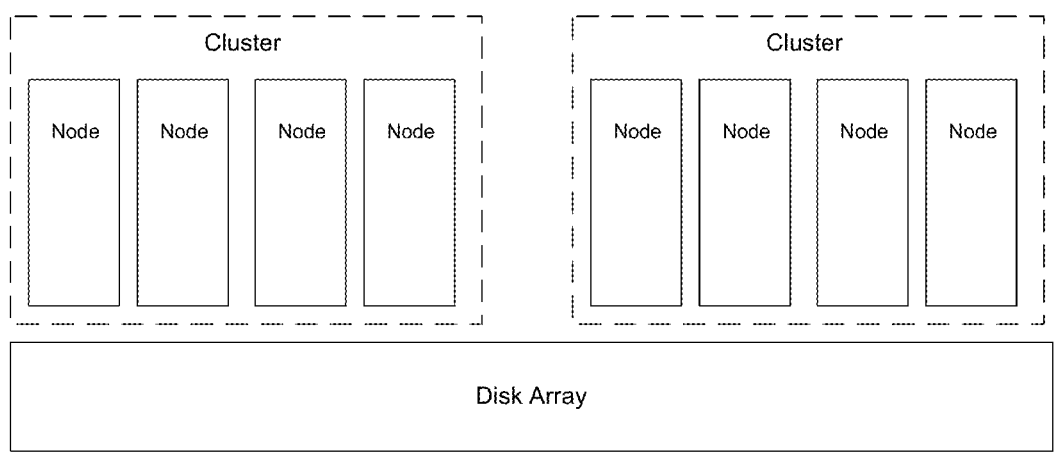
FIG. 8 shows a diagram depicting a high availability multi-cluster-based computing system in accordance with one embodiment of the present invention.

FIG. 8 shows a diagram depicting a high availability multi-cluster-based computing system in accordance with one embodiment of the present invention. The FIG. 8 embodiment is yet another alternative to the FIG. 2 embodiment in that two or more clusters are coupled to a single disk array.

As illustrated in FIG. 8, two clusters are shown, each comprising a four node cluster. Each of the constituent nodes is shown connected to a common disk array. As stated above, although the embodiments described in the context of clusters of four nodes, it should be appreciated that embodiments of the present invention can readily scale and function in distributed computer systems and/or cloud based computer systems having hundreds or thousands of nodes.

As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

Figure 9:
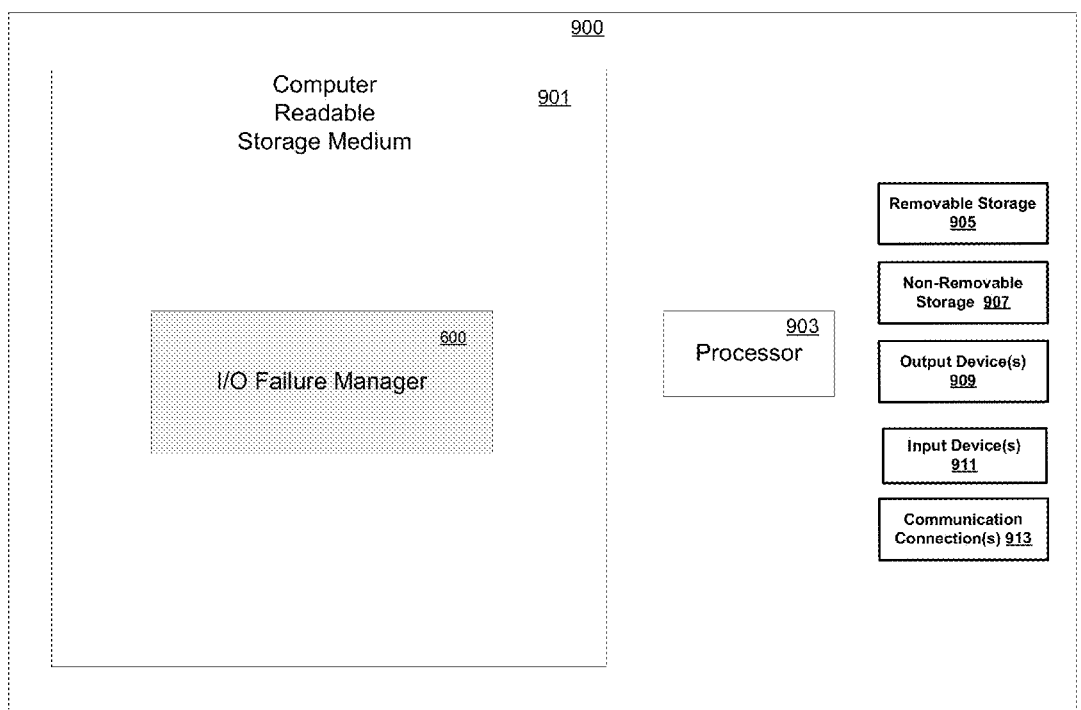
FIG. 9 shows an exemplary computer system 900 according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., failure detection agent 600 from FIG. 6) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as dynamic random access memory (DRAM), etc.), non-volatile (e.g., such as read only memory (ROM), flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

Figure 10:
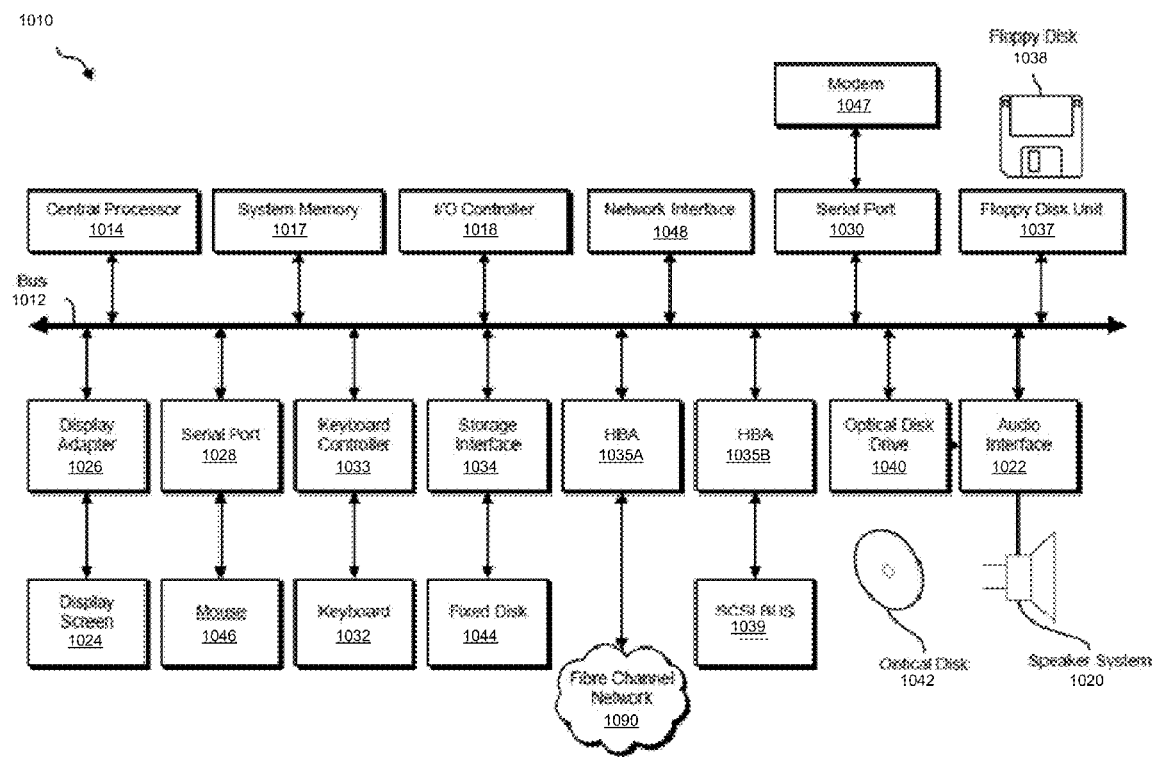
FIG. 10 depicts a block diagram of a second computer system 1010 suitable for implementing certain functionality in accordance with one embodiment of the present invention.

FIG. 10 depicts a block diagram of a second computer system 1010 suitable for implementing certain functionality in accordance with one embodiment of the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fiber Channel network 1090, a host bus adapter (HBA) interface card 1035B operative to connect to a small computer system interface (SCSI) bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. In the FIG. 10 embodiment, the system memory 1017 instantiates a replication manager module 1050 which implements the continuous replication functionality described above. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for fast input/output (I/O) path failure detection and cluster wide failover, comprising:
   accessing a distributed computer system having a cluster including a plurality of nodes;
   experiencing an I/O path failure for a storage device;
   generating an I/O failure message in response to the I/O path failure;
   broadcasting a cluster wide I/O failure message to the plurality of nodes that designates a faulted controller;
   upon receiving I/O failure responses from the plurality of nodes, broadcasting an I/O queue message to the nodes to cause the nodes to queue I/O through the faulted controller and switch to an alternate controller; and
   upon receiving I/O queue responses from the plurality of nodes, broadcasting an I/O failover commit message to the nodes to cause the nodes to commit to a failover and un-queue their I/O.

2. The method of claim 1, wherein the I/O failure message is a cluster wide broadcast message.

3. The method of claim 1, wherein the I/O queue message is a cluster wide broadcast message.

4. The method of claim 1, wherein the I/O failover commit message is a cluster wide broadcast message.

5. The method of claim 1, wherein the cluster wide I/O failure message includes an I/O path failure identifier (ID) that identifies an I/O path that caused the I/O path failure.

6. The method of claim 1, wherein the cluster wide I/O failure message includes a controller identifier (ID) that identifies a controller through which the I/O path failure transited.

7. The method of claim 1, wherein the storage device comprises a logical unit number (LUN) of a disk array.

8. A non-transitory computer readable storage medium having stored thereon, computer executable instructions that, if executed by a computer system cause the computer system to perform a method for fast input/output (I/O) path failure detection and cluster wide failover, comprising:
   accessing a distributed computer system having a cluster including a plurality of nodes;
   experiencing an I/O path failure for a storage device;
   generating an I/O failure message in response to the I/O path failure;
   broadcasting a cluster wide I/O failure message to the plurality of nodes that designates a faulted controller;
   upon receiving I/O failure responses from the plurality of nodes, broadcasting an I/O queue message to the nodes to cause the nodes to queue I/O through the faulted controller and switch to an alternate controller; and
   upon receiving I/O queue responses from the plurality of nodes, broadcasting an I/O failover commit message to the nodes to cause the nodes to commit to a failover and un-queue their I/O.

9. The non-transitory computer readable storage medium of claim 8, wherein the I/O failure message is a cluster wide broadcast message.

10. The non-transitory computer readable storage medium of claim 8, wherein the I/O queue message is a cluster wide broadcast message.

11. The non-transitory computer readable storage medium of claim 8, wherein the I/O failover commit message is a cluster wide broadcast message.

12. The non-transitory computer readable storage medium of claim 8, wherein the cluster wide I/O failure message includes an I/O path failure identifier (ID) that identifies an I/O path that caused the I/O path failure.

13. The non-transitory computer readable storage medium of claim 8, wherein the cluster wide I/O failure message includes a controller identifier (ID) that identifies a controller through which the I/O path failure transited.

14. The non-transitory computer readable storage medium of claim 8, wherein the storage device comprises a logical unit number (LUN) of a disk array.

15. A server computer system, comprising:
   a computer system having a processor coupled to a computer readable storage medium and executing computer readable code which causes the computer system to implement a failure detection agent that functions by:
   accessing a distributed computer system having a cluster including a plurality of nodes;
   experiencing an input/output (I/O) path failure for a storage device;
   generating an I/O failure message in response to the I/O path failure;
   broadcasting a cluster wide I/O failure message to the plurality of nodes that designates a faulted controller;
   upon receiving I/O failure responses from the plurality of nodes, broadcasting an I/O queue message to the nodes to cause the nodes to queue I/O through the faulted controller and switch to an alternate controller; and
   upon receiving I/O queue responses from the plurality of nodes, broadcasting an I/O failover commit message to the nodes to cause the nodes to commit to a failover and un-queue their I/O.

16. The server computer system of claim 15, wherein the I/O failure message is a cluster wide broadcast message.

17. The server computer system of claim 15, wherein the I/O queue message is a cluster wide broadcast message.

18. The server computer system of claim 15 wherein the I/O failover commit message is a cluster wide broadcast message.

19. The server computer system of claim 15, wherein the cluster wide I/O failure message includes an I/O path failure identifier (ID) that identifies an I/O path that caused the I/O path failure.

20. The server computer system of claim 15, wherein the cluster wide I/O failure message includes a controller identifier (ID) that identifies a controller through which the I/O path failure transited.

* * * * *